United States Patent
Silbert

(10) Patent No.: US 11,879,529 B1
(45) Date of Patent: Jan. 23, 2024

(54) GEARBOX FOR ELECTRIC OFF-ROAD VEHICLES

(71) Applicant: FCA US LLC, Auburn Hills, MI (US)

(72) Inventor: Richard S Silbert, Bingham Farms, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/309,184

(22) Filed: Apr. 28, 2023

(51) Int. Cl.
*F16H 37/08* (2006.01)
*B60K 1/00* (2006.01)
*B60K 17/08* (2006.01)

(52) U.S. Cl.
CPC ............ *F16H 37/082* (2013.01); *B60K 1/00* (2013.01); *B60K 17/08* (2013.01); *B60K 2001/001* (2013.01); *F16H 2200/0021* (2013.01); *F16H 2200/0034* (2013.01); *F16H 2200/2007* (2013.01); *F16H 2200/2094* (2013.01)

(58) Field of Classification Search
CPC ........... F16H 37/082; F16H 2200/0021; F16H 2200/0034; F16H 2200/2007; F16H 2200/2094; F16H 37/2041; B60K 1/00; B60K 17/08; B60K 2001/001
USPC ........................................................ 475/149
See application file for complete search history.

(56) References Cited

U.S. PATENT DOCUMENTS

| | | | | |
|---|---|---|---|---|
| 2005/0266953 | A1* | 12/2005 | Puiu | B60K 23/0808 475/221 |
| 2011/0319211 | A1* | 12/2011 | Si | F16H 3/728 475/5 |
| 2015/0330492 | A1* | 11/2015 | Lee | F16H 37/0813 475/331 |
| 2016/0230841 | A1* | 8/2016 | Hiramatsu | B60W 20/50 |
| 2020/0031223 | A1* | 1/2020 | Eo | F16H 3/66 |
| 2022/0373067 | A1* | 11/2022 | Shim | B60K 1/00 |
| 2023/0100807 | A1* | 3/2023 | Chai | B60L 15/20 180/65.6 |

* cited by examiner

*Primary Examiner* — Colby M Hansen
(74) *Attorney, Agent, or Firm* — Jeremy J. Klobucar

(57) ABSTRACT

A two-speed gearbox assembly for an electric drive vehicle includes a housing, a first planetary gear set configured to operably connect to an output of an electric motor to drive a first axle, the first planetary gear set including a first sun gear, a first carrier, and a first ring gear, a first clutch configured to selectively ground the first ring gear, and a second clutch configured to selectively ground the first carrier. A second planetary gear set is configured to operably connect to the output of the electric motor to drive a second axle, the second planetary gear set including a second sun gear, a second carrier, and a second ring gear. A third clutch is configured to selectively ground the second ring gear, and a fourth clutch is configured to selectively ground the second carrier. The first, second, third, and fourth clutches are independently controlled.

17 Claims, 2 Drawing Sheets

GEARBOX FOR ELECTRIC OFF-ROAD VEHICLES

FIELD

The present application relates generally to gearboxes for electric vehicles and, more particularly, to a two-speed gearbox for electric vehicle off-road applications.

BACKGROUND

Vehicle off-road driving typically requires low speed and high torque operation over a sustained period of time. In vehicles with internal combustion engines, this is commonly achieved through additional gearing in the transfer case. However, battery electric vehicles typically have single speed gearboxes, which while providing good torque capability, are unable to provide sustained high torque. Such gearboxes may provide sustained high torque through higher ratio gearing, but this is not ideal for meeting range and performance requirements for on-road usage. Accordingly, while such gearing systems do work well for their intended purpose, there is a desire for improvement in the relevant art.

SUMMARY

In accordance with one example aspect of the invention, a two-speed gearbox assembly for an electric drive vehicle is provided. The gearbox assembly includes a housing, a first planetary gear set configured to operably connect to an output of an electric motor to drive a first axle, the first planetary gear set including a first sun gear, a first carrier, and a first ring gear, a first clutch configured to selectively ground the first ring gear, and a second clutch configured to selectively ground the first carrier. A second planetary gear set is configured to operably connect to the output of the electric motor to drive a second axle, the second planetary gear set including a second sun gear, a second carrier, and a second ring gear. A third clutch is configured to selectively ground the second ring gear, and a fourth clutch is configured to selectively ground the second carrier. The first, second, third, and fourth clutches are independently controlled to enable independent control of a direction of rotation of each of the first axle and the second axle.

In addition to the foregoing, the described gearbox assembly may include one or more of the following features: wherein the gearbox assembly is selectively switchable between (i) a first drive mode where each of the first, second, third, or fourth clutches are disengaged, (ii) a second drive mode where the first and third clutches are engaged and the second and fourth clutches are disengaged, and (iii) a third drive mode where the first and third clutches are disengaged and the second and fourth clutches are engaged.

In addition to the foregoing, the described gearbox assembly may include one or more of the following features: wherein in the first drive mode the first and second sun gears respectively drive the first and second axles; wherein the first and second axles are driven in a 1:1 ratio; wherein in the second drive mode the first and second carriers respectively drive the first and second axles in a first direction; wherein the first and second axles are driven in a 3:1 ratio; wherein in the third drive mode the first and second ring gears respectively drive the first and second axles in a second direction; and wherein the first and second axles are driven in a 3:1 ratio.

In addition to the foregoing, the described gearbox assembly may include one or more of the following features: wherein the gearbox assembly is further selectively switchable between (iv) a fourth drive mode where the first and fourth clutches are engaged and the second and third clutches are disengaged, and (v) a fifth drive mode where the first and fourth clutches are disengaged and the second and third clutches are engaged; wherein in the fourth drive mode the first carrier drives the first axle in a first direction, and the second ring gear drives the second axle in an opposite second direction; and wherein in the fifth drive mode the first ring gear drives the first axle in a first direction, and the second carrier drives the second axle in an opposite second direction.

In addition to the foregoing, the described gearbox assembly may include one or more of the following features: wherein the first drive mode provides an on-road first gear, the second drive mode provides an off-road second gear in a first direction, and the third drive mode provides an off-road third gear in an opposite second direction; an input gear configured to operably couple to the output of the electric motor, a first input shaft coupled for rotation with the input gear to provide rotational input to the first sun gear, and a second input shaft coupled for rotation with the input gear to provide rotational input to the second sun gear; and wherein the first and second input shafts are coaxial.

In accordance with another example aspect of the invention, an electric vehicle is provided. In one example, the electric vehicle includes an electric motor having an output shaft, first and second axle shafts, and a gearbox assembly operably coupled between the electric motor and the first and second axle shaft. The gearbox assembly includes a housing, a first planetary gear set configured to operably connect to the electric motor output shaft to drive the first axle, the first planetary gear set including a first sun gear, a first carrier, and a first ring gear, a first clutch configured to selectively ground the first ring gear, and a second clutch configured to selectively ground the first carrier. A second planetary gear set is configured to operably connect to the electric motor output shaft to drive the second axle, the second planetary gear set including a second sun gear, a second carrier, and a second ring gear. A third clutch is configured to selectively ground the second ring gear; and a fourth clutch is configured to selectively ground the second carrier. The first, second, third, and fourth clutches are independently controlled to enable independent control of a direction of rotation of each of the first axle shaft and the second axle shaft.

In addition to the foregoing, the described electric vehicle may include one or more of the following features: wherein the gearbox assembly is selectively switchable between (i) a first drive mode where each of the first, second, third, or fourth clutches are disengaged, (ii) a second drive mode where the first and third clutches are engaged and the second and fourth clutches are disengaged, and (iii) a third drive mode where the first and third clutches are disengaged and the second and fourth clutches are engaged; and wherein the gearbox assembly is further selectively switchable between (iv) a fourth drive mode where the first and fourth clutches are engaged and the second and third clutches are disengaged, and (v) a fifth drive mode where the first and fourth clutches are disengaged and the second and third clutches are engaged.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for a two-speed electric drive gearbox for off-road electric drive applications. The gearbox only requires a single motor or driven input, and includes twin planetary output geartrains. Each planetary output geartrain includes clutches at the planet carrier and annulus gear. The clutches are independently controlled, thereby enabling independent rotational control (forward/reverse) of left and right outputs. Moreover, the gearbox is configured to provide on-road performance with a first or "HI" gear ratio, and sustained high torque, low speed off-road performance with a second or "LO" gear ratio. As such, the gearbox arrangement allows a single electric motor to accomplish several drive modes.

By providing two gearing ratios in the electric drive module to handle both on-road and off-road requirements, the design does not require a "middle" ratio, which would necessitate a traction inverter and electric motor with higher power and current/torque capability. Such an electric motor would inherently have a higher cost and larger volume, which could potentially present packaging challenges.

In this way, the gearbox design described herein provides a balance between efficiency and performance (e.g., acceleration, grade climbing prowess, vehicle top speed) between large and small motors, as larger electric motors tend to be less efficient for the same set of vehicle loads/speeds. Accordingly, on-road performance requirements can drive motor peak power requirements at an appropriate ratio, while the off-road requirements (including grade climbing capability) that typically drive peak torque requirements may be used to choose the low gear ratio. As such, the described design obviates conventional systems such as large motors with large ratio spreads, or expensive and complex individual electric drive modules for each wheel.

Figure 1:
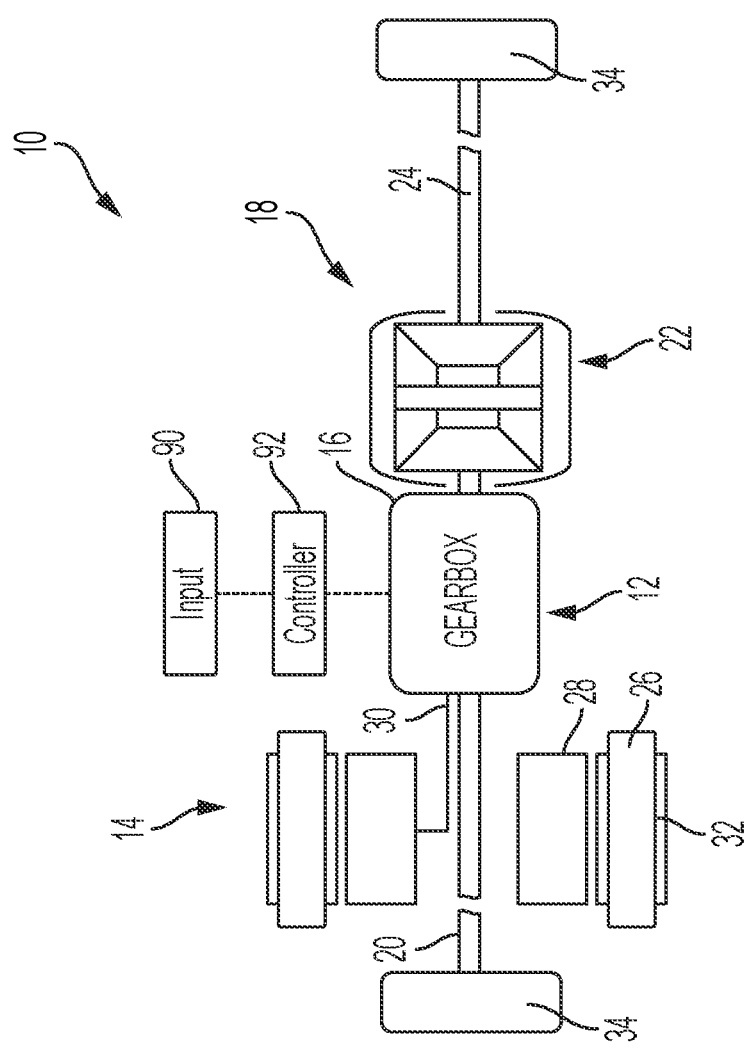
FIG. 1 is a schematic illustration of an example electric vehicle drivetrain having a two-speed gearbox for off-road electric drive applications, in accordance with the principles of the present application.

With initial reference to FIG. 1, a vehicle 10 is partially shown in accordance with the principles of the present disclosure is illustrated. In the example embodiment, vehicle 10 includes a propulsion system 12 that generally includes one or more drive units or motors 14 (e.g., electric traction motors) and a two-speed electric drive gearbox assembly 16. The electric motor 14 is selectively connectable via a traction inverter to a high voltage battery system (not shown) for powering the electric motor 14, and the gearbox assembly 16 is configured to transfer the generated drive torque to a driveline 18, including a first or left axle shaft 20, a differential 22, and a second or right axle shaft 24. In the example embodiment, the electric motor 14 generally includes a stator 26, a rotor 28, and a rotor output shaft 30.

The stator 26 is fixed (e.g., to a housing 32) and the rotor 28 is configured to rotate relative to the stator 26 to drive the rotor shaft 30 and thus the vehicle axles 20, 24 (e.g., half shafts) and wheels 34.

As previously described, in the example embodiment, the gearbox assembly 16 is a compact two-speed electric drive gearbox that provides a first or HI gear for normal on-road driving, and a second or LO gear for sustained high torque, low speed off-road driving. In addition, each of the axles 20, 24 are independently controlled to rotate in either a forward or reverse direction, as described herein in more detail. For example, axles 20, 24 may be both driven in a forward direction to perform a forward maneuver, a rearward direction to perform a rearward maneuver, or be driven in opposite directions to enable the vehicle to rotate in place around a predefined pivot point.

Figure 2:
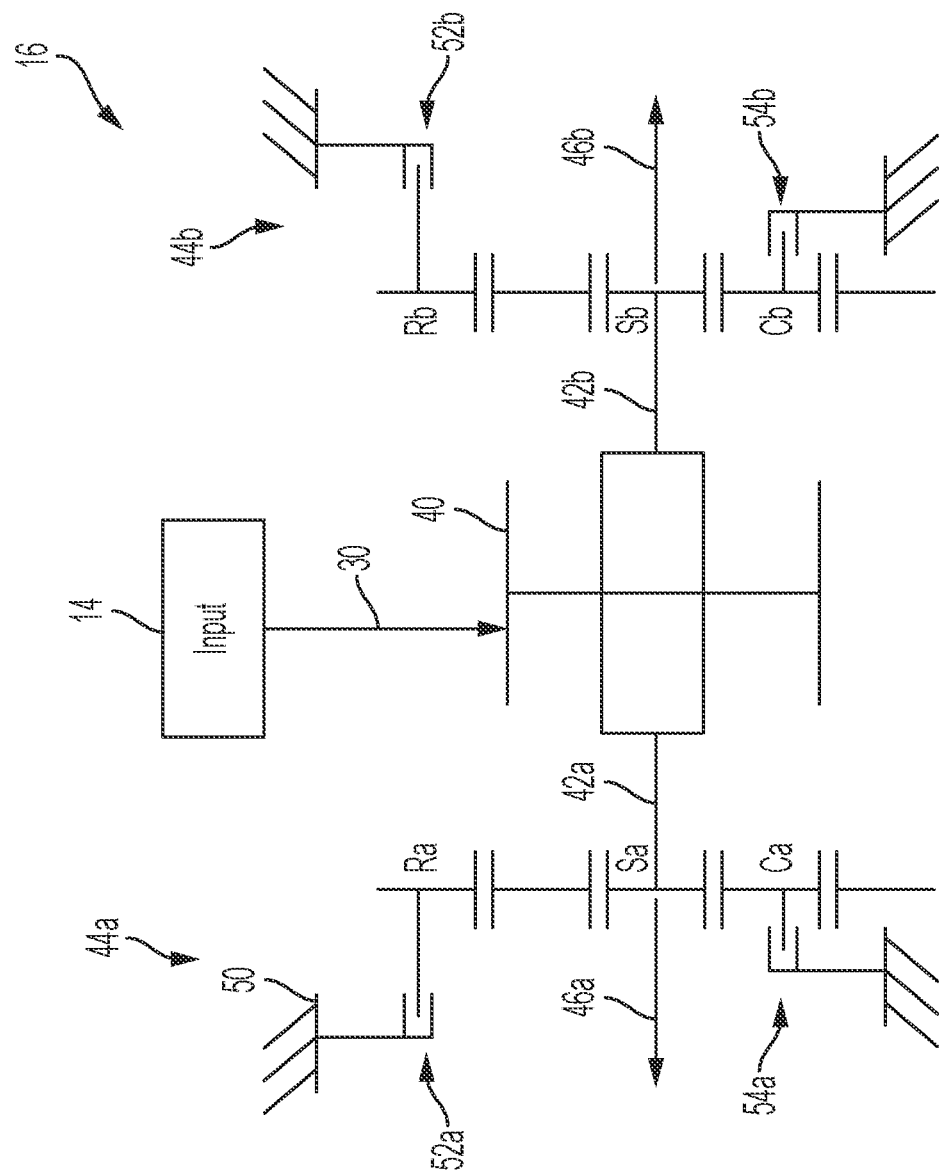
FIG. 2 is a schematic illustration of the example gearbox shown in FIG. 1, in accordance with the principles of the present application.

With reference now to FIG. 2, the two-speed electric drive gearbox assembly 16 will be described in more detail. In the example embodiment, the gearbox assembly 16 is linked to the electric motor 14 through the rotor or motor output shaft 30. Rotational output from the motor output shaft is received by an input gear 40 of the gearbox assembly 16, which then transfers the rotation through opposed (left/right) coaxial input shafts 42a, 42b to respective, opposed (left/right) twin planetary output gear sets 44a, 44b. The twin planetary output gear sets 44a, 44b then transfer the rotation to respective output shafts 46a, 46b to the drivetrain of vehicle 10 to thereby rotate the vehicle axles 24 and wheels 34.

In the example embodiment, the left planetary output geartrain 44a generally includes a sun gear 'Sa', a carrier 'Ca' supporting planet gears, and an annulus or ring gear 'Ra'. Similarly, the right planetary output geartrain 44b generally includes a sun gear 'Sb', a carrier 'Cb' supporting planet gears, and an annulus or ring gear 'Rb'.

The gearbox assembly 16 also includes a housing 50, first and second annulus clutches 52a, 52b, and first and second planet carrier clutches 54a, 54b. The annulus clutches 52a, 52b are configured to selectively and respectively ground the ring gears 'Ra' and 'Rb', for example to housing 50. The planet carrier clutches 54a, 54b are configured to selectively and respectively ground the planet carriers 'Ca' and 'Cb', for example to housing 50. In one example implementation, clutches 52a, 52b and 54a, 54b are dog clutches actuated by a shift mechanism (not shown), which may be a mechanical shift lever movable in on/off positions with a single axial translation mechanism. In this way, the shift mechanism does not require friction elements, hydraulics, lubrication, or cooling. However, it will be appreciated that clutches 52a, 52b and 54a, 54b may be any type of suitable clutch that enables gearbox assembly 16 to function as described herein.

In the illustrated example, the first planetary gear set 44a is positioned on one side (e.g., left) of the gearbox assembly input gear 40. The sun gear 'Sa' is connected for common rotation with the gearbox assembly input shaft 42a and output shaft 46a. With both annulus clutch 52a and planet carrier clutch 52a disengaged, output from the sun gear 'Sa' to the output shaft 46a is 1:1. With annulus clutch 52a engaged and planet carrier clutch 54a disengaged, the planet carrier 'Ca' provides a reduction (e.g., 3:1) to rotate the output shaft 46a (via a selectable connection, not shown) in a first direction. With annulus clutch 52a disengaged and planet carrier clutch 54a engaged, the ring gear 'Ra' provides a reduction (e.g., 3:1) to rotate the output shaft 46a (via a selectable connection, not shown) in a second direction opposite the first direction.

In the example embodiment, similar to the first planetary gear set 44a, the second planetary gear set 44b is positioned on the other side (e.g., right) of the gearbox assembly input gear 40. The sun gear 'Sb' is connected for common rotation with the gearbox assembly input shaft 42b and output shaft 46b. With both annulus clutch 52b and planet carrier clutch 52b disengaged, output from the sun gear 'Sb' to the output shaft 46b is 1:1. With annulus clutch 52b engaged and planet carrier clutch 54b disengaged, the planet carrier 'Cb' provides a reduction (e.g., 3:1) to rotate the output shaft 46b in a first direction. With annulus clutch 52b disengaged and planet carrier clutch 54b engaged, the ring gear 'Rb' provides a reduction (e.g., 3:1) to rotate the output shaft 46b in a second direction opposite the first direction.

With continued reference to FIG. 2, operation in the on-road HI gear will be described in more detail. In the example operation, an automatic or driver controlled shifting mechanism (not shown) is actuated to disengage/open both annulus clutches 52a, 52b and disengage/open both planet carrier clutches 54a, 54b. Rotation from motor output shaft 30 is transferred to the gearbox assembly input gear 40 to rotate both input shafts 42a, 42b in the same direction. The input shafts 42a, 42b respectively rotate the sun gears 'Sa' and 'Sb', which in turn respectively rotate the gearbox assembly output shafts 46a, 46b in a 1:1 ratio to rotate the axle shafts 20, 24 and vehicle wheels 34 in the forward or reverse direction depending on the rotation direction of motor output shaft 30.

With continued reference to FIG. 2, operation in the off-road LO gear will be described in more detail. In one example, shifting operation to the off-road LO gear is initiated by an operator input, for example, via a button/switch or touchscreen display 90 (FIG. 1) in the vehicle interior. Based on the operator input, a controller 92 (FIG. 1) commands the shifting mechanism to simultaneously engage (close) either both annulus clutches 52a, 52b or both planet carrier clutches 54a, 54b. When both annulus clutches 52a, 52b are engaged, the gearbox assembly output shafts 46a, 46b are rotated in a first direction, for example in a 3:1 ratio. When both planet carrier clutches 54a, 54b are engaged, the gearbox assembly output shafts 46a, 46b are rotated in an opposite second direction, for example, in a 3:1 ratio.

When both annulus clutches 52a, 52b are engaged, the ring gears 'Ra' and 'Rb' are grounded and prevented from rotating. Subsequent rotation from motor output shaft 30 is transferred to the gearbox assembly input gear 40 to rotate both input shafts 42a, 42b in the same direction. The input shafts 42a, 42b respectively rotate the sun gears 'Sa' and 'Sb', which in turn respectively rotate the planet carriers 'Ca' and 'Cb' while the ring gears 'Ra' and 'Rb' are grounded. Outputs from the planet carriers 'Ca' and 'Cb' rotate the gearbox assembly output shafts 46a, 46b to thereby rotate the axle shafts 20, 24 and vehicle wheels 34 in the first direction.

When both planet carrier clutches 54a, 54b are engaged, the planet carriers 'Ca' and 'Cb' are grounded and prevented from rotating. Subsequent rotation from motor output shaft 30 is transferred to the gearbox assembly input gear 40 to rotate both input shafts 42a, 42b in the same direction. The input shafts 42a, 42b respectively rotate the sun gears 'Sa' and 'Sb', which in turn respectively rotate the ring gears 'Ra' and 'Rb' while the planet carriers 'Ca' and 'Cb' are grounded. Outputs from the ring gears 'Ra' and 'Rb' rotate the gearbox assembly output shafts 46a, 46b to thereby rotate the axle shafts 20, 24 and vehicle wheels 34 in the opposite second direction.

Described herein are systems and methods for a two-speed electric drive gearbox assembly for an electric vehicle. The two-speed gearbox assembly is configured to provide both an on-road gear ratio as well as a sustained high torque, low speed off-road gear ratio. To achieve the two-speed functionality, the gearbox assembly includes twin planetary gear sets each with two selectively engageable clutches. The first clutch selectively engages and grounds the annulus or ring gear of the particular planetary gear set, and the second clutch selectively engages and grounds the carrier of the particular planetary gear set.

With all clutches disengaged, output from the sun gears is 1:1. With only the first clutches engaged, output from the carriers is 3:1 in a first rotational direction. With only the second clutches engaged, output from the ring gears is 3:1 in an opposite second rotational direction. As such, the gearbox arrangement enables a single electric motor (per axle) to accomplish several drive modes. With the independently controlled clutches, the system advantageously enables independent control of left and right outputs to rotate in different directions. This enables the vehicle to rotate about a pivot point to allow improved mobility on low friction surfaces and to achieve high speed off-road maneuverability.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A two-speed gearbox assembly for an electric drive vehicle, the gearbox assembly comprising:
    a housing;
    a first planetary gear set configured to operably connect to an output of an electric motor to drive a first axle, the first planetary gear set including a first sun gear, a first carrier, and a first ring gear;
    a first clutch configured to selectively ground the first ring gear;
    a second clutch configured to selectively ground the first carrier;
    a second planetary gear set configured to operably connect to the output of the electric motor to drive a second axle, the second planetary gear set including a second sun gear, a second carrier, and a second ring gear;

a third clutch configured to selectively ground the second ring gear; and a fourth clutch configured to selectively ground the second carrier, wherein the first, second, third, and fourth clutches are independently controlled to enable independent control of a direction of rotation of each of the first axle and the second axle.

2. The gearbox assembly of claim 1, wherein the gearbox assembly is selectively switchable between (i) a first drive mode where each of the first, second, third, or fourth clutches are disengaged, (ii) a second drive mode where the first and third clutches are engaged and the second and fourth clutches are disengaged, and (iii) a third drive mode where the first and third clutches are disengaged and the second and fourth clutches are engaged.

3. The gearbox assembly of claim 2, wherein in the first drive mode the first and second sun gears respectively drive the first and second axles.

4. The gearbox assembly of claim 3, wherein the first and second axles are driven in a 1:1 ratio.

5. The gearbox assembly of claim 2, wherein in the second drive mode the first and second carriers respectively drive the first and second axles in a first direction.

6. The gearbox assembly of claim 5, wherein the first and second axles are driven in a 3:1 ratio.

7. The gearbox assembly of claim 2, wherein in the third drive mode the first and second ring gears respectively drive the first and second axles in a second direction.

8. The gearbox assembly of claim 7, wherein the first and second axles are driven in a 3:1 ratio.

9. The gearbox assembly of claim 2, wherein the gearbox assembly is further selectively switchable between (iv) a fourth drive mode where the first and fourth clutches are engaged and the second and third clutches are disengaged, and (v) a fifth drive mode where the first and fourth clutches are disengaged and the second and third clutches are engaged.

10. The gearbox assembly of claim 9, wherein in the fourth drive mode the first carrier drives the first axle in a first direction, and the second ring gear drives the second axle in an opposite second direction.

11. The gearbox assembly of claim 9, wherein in the fifth drive mode the first ring gear drives the first axle in a first direction, and the second carrier drives the second axle in an opposite second direction.

12. The gearbox assembly of claim 2, wherein the first drive mode provides an on-road first gear, the second drive mode provides an off-road second gear in a first direction, and the third drive mode provides an off-road third gear in an opposite second direction.

13. The gearbox assembly of claim 1, further comprising:
an input gear configured to operably couple to the output of the electric motor;
a first input shaft coupled for rotation with the input gear to provide rotational input to the first sun gear; and
a second input shaft coupled for rotation with the input gear to provide rotational input to the second sun gear.

14. The gearbox assembly of claim 13, wherein the first and second input shafts are coaxial.

15. An electric vehicle, comprising:
an electric motor having an output shaft;
first and second axle shafts; and
a gearbox assembly operably coupled between the electric motor and the first and second axle shaft, the gearbox assembly comprising:
a housing;
a first planetary gear set configured to operably connect to the electric motor output shaft to drive the first axle, the first planetary gear set including a first sun gear, a first carrier, and a first ring gear;
a first clutch configured to selectively ground the first ring gear;
a second clutch configured to selectively ground the first carrier;
a second planetary gear set configured to operably connect to the electric motor output shaft to drive the second axle, the second planetary gear set including a second sun gear, a second carrier, and a second ring gear;
a third clutch configured to selectively ground the second ring gear; and
a fourth clutch configured to selectively ground the second carrier,
wherein the first, second, third, and fourth clutches are independently controlled to enable independent control of a direction of rotation of each of the first axle shaft and the second axle shaft.

16. The electric vehicle of claim 15, wherein the gearbox assembly is selectively switchable between (i) a first drive mode where each of the first, second, third, or fourth clutches are disengaged, (ii) a second drive mode where the first and third clutches are engaged and the second and fourth clutches are disengaged, and (iii) a third drive mode where the first and third clutches are disengaged and the second and fourth clutches are engaged.

17. The electric vehicle of claim 16, wherein the gearbox assembly is further selectively switchable between (iv) a fourth drive mode where the first and fourth clutches are engaged and the second and third clutches are disengaged, and (v) a fifth drive mode where the first and fourth clutches are disengaged and the second and third clutches are engaged.

* * * * *